US 9,229,939 B2

(12) United States Patent
McKenna et al.

(10) Patent No.: US 9,229,939 B2
(45) Date of Patent: Jan. 5, 2016

(54) SYSTEM AND METHOD FOR ARRANGING ITEMS FOR DISPLAY

(75) Inventors: Stephen McKenna, Dundee (GB); Ruixuan Wang, Dundee (GB); Annette Ward, Angus (GB)

(73) Assignee: The University of Dundee, Nethergate Dundee (GB)

( * ) Notice: Subject to any disclaimer, the term of this patent is extended or adjusted under 35 U.S.C. 154(b) by 743 days.

(21) Appl. No.: 13/146,667

(22) PCT Filed: Jan. 28, 2010

(86) PCT No.: PCT/GB2010/000141
§ 371 (c)(1),
(2), (4) Date: Mar. 8, 2012

(87) PCT Pub. No.: WO2010/086610
PCT Pub. Date: Aug. 5, 2010

(65) Prior Publication Data
US 2013/0088517 A1    Apr. 11, 2013

(30) Foreign Application Priority Data
Jan. 28, 2009    (GB) .................................. 0901351.7

(51) Int. Cl.
*G06F 17/00* (2006.01)
*G06F 17/30* (2006.01)

(52) U.S. Cl.
CPC .... *G06F 17/30061* (2013.01); *G06F 17/30274* (2013.01); *G06F 17/30994* (2013.01)

(58) Field of Classification Search
CPC .................... G06F 17/30061; G06F 17/30274; G06F 17/30994
USPC ................................... 715/243, 234; 345/635
See application file for complete search history.

(56) References Cited

U.S. PATENT DOCUMENTS

| 8,249,344 | B2* | 8/2012 | Viola et al. ..................... 382/173 |
| 2001/0033693 | A1* | 10/2001 | Seol et al. ...................... 382/219 |
| 2004/0145593 | A1* | 7/2004 | Berkner et al. ................ 345/619 |
| 2005/0084136 | A1* | 4/2005 | Xie et al. ....................... 382/107 |
| 2005/0094901 | A1* | 5/2005 | Seol et al. ...................... 382/305 |

(Continued)

FOREIGN PATENT DOCUMENTS

GB    2430130    3/2007

OTHER PUBLICATIONS

International Search Report for PCT/GB2010/000141 dated Jun. 23, 2010, 4 pages.

(Continued)

Primary Examiner — Stephen Hong
Assistant Examiner — Marshon Robinson
(74) Attorney, Agent, or Firm — Reising Ethington P.C.

(57) ABSTRACT

A system for arranging searchable items, such as digital images or multimedia icons for presentation on a graphical user interface. The system has an optimizer module which minimizes a cost function for arranging items in a layout space and is applied to one or more predetermined characteristics of the items. The optimizer module also creates a mixture distribution by considering each item as having a spatial distribution in the layout space and controls the entropy of the mixture distribution in order to maximize the extent to which each item occupies a separate position in the layout space. A Renderer module then renders the layouts to generate a display.

31 Claims, 14 Drawing Sheets

(56) References Cited

U.S. PATENT DOCUMENTS

| | | | |
|---|---|---|---|
| 2007/0058884 A1* | 3/2007 | Rother et al. | 382/284 |
| 2007/0110335 A1* | 5/2007 | Taylor et al. | 382/284 |
| 2008/0118160 A1* | 5/2008 | Fan et al. | 382/225 |
| 2008/0317337 A1* | 12/2008 | Wang et al. | 382/165 |
| 2011/0116715 A1* | 5/2011 | Wang et al. | 382/177 |
| 2011/0153602 A1* | 6/2011 | Kiddle et al. | 707/731 |
| 2011/0194761 A1* | 8/2011 | Wang et al. | 382/165 |
| 2011/0286647 A1* | 11/2011 | Cao et al. | 382/131 |

OTHER PUBLICATIONS

Written Opinion for PCT/GB2010/000141 dated Jun. 23, 2010, 6 pages.

Schaefer, G., et al., "Effective and Efficient Browsing of Image Databases" Int. K. Imaging Systems Technology, vol. 18, 2008, pp. 137-145, XP002586014.

Nguyen, G.P., et al., "Similarity Based Visualization of Image Collections", AVIVDILIB '05 Seventh Int. Workshop of the EU Network of Excellence Delos on Audio-Visual Content and Information Visualization in Digital Libraries, pp. 1-13, XP002586013.

Hao Liu et al., "Effective Browsing of Web Image Search Results," Mir, 2004, pp. 1-7.

Baback Moghaddam et al., "Visualization & User-Modeling for Browsing Personal Photo Libraries," International Journal of Computer Vision, 56 (1/2), 2004, pp. 1-34.

Boaz Nadler et al., "Diffusion Maps, Spectral Clustering and Eigenfunctions of Fokker-Planck Operators," Department of Mathematics, Yale University, Date not available, pp. 1-8.

Kerry Rodden, "Evaluating Similarity-Based Visualisations as Interfaces for Image Browsing," University of Cambridge Computer Laboratory, No. 543, Sep. 2002, pp. 1-248.

Yossi Rubner et al, "A Metric for Distributions with Applications to Image Databases," Computer Science Department, Stanford University, 1998, pp. 1-8.

Joshua B. Tenenbaum et al., "A Global Geometric Framework for Nonlinear Dimensionality Reduction," Science 290, 2000, pp. 1-6.

Kari Torkkola, "Feature Extraction by Non-Parametric Mutual Information Maximization," Journal of Machine Learning Research 3, 2003, pp. 1-24.

Kilian Q. Weinberger et al., "Nonlinear Dimensionality Reduction by Semidefinite Programming and Kernel Matrix Factorization," Department of Computer and Information Science, University of Pennsylvania, 2005 pp. 1-8.

G.P. Nguyen et al., "Interactive Access to Large Image Collections Using Similarity-Based Visualization," Science Direct, 2008, pp. 1-22.

Wojciech Basalaj, "Proximity Visualisation of Abstract Data," University of Cambridge Computer Laboratory, No. 509, Jan. 2001, pp. 1-133.

Mikhail Belkin et al., "Laplacian Eigenmaps and Spectral Techniques for Embedding and Clustering," Department of Mathematics and Computer Science, University of Chicago, 2002 pp. 1-7.

Hyunmo Kang et al., "Visualization Methods for Personal Photo Collections: Browsing and Searching in the PhotoFinder," Department of Computer Science, Human-Computer Interaction Laboratory, University of Maryland at College Park, 2000, pp. 1-4.

* cited by examiner

No threshold on step size	τ = 0.05

(a) 1st iteration (b) 10th iteration (c) 50th iteration

SYSTEM AND METHOD FOR ARRANGING ITEMS FOR DISPLAY

INTRODUCTION

The present invention relates to a system and a method for arranging items for display and in particular, but not exclusively to the viewing of images which can be displayed graphically when using an image browsing system. The present invention can also be used to arrange other digital assets which are capable of being represented graphically on a display.

BACKGROUND TO THE INVENTION

Humans can process a tremendous amount of visual and multimedia information. However, they often have difficulty precisely defining and describing such information. For example, it is estimated that the brain can distinguish about 10,000 nuances in colour yet individuals can name only a small number of colour terms (approximately 12). As a consequence, accessing images when searching a database may be challenging using text-based searches which typically use metadata.

Content-based indexing and retrieval methods provide a partial solution to this problem. Emphasis in many content-based retrieval systems is on automated retrieval of relevant items based on notions of similarity to a query item. For example, content-based image retrieval (CBIR) can use features of a selected image of a painting, photograph, print, drawing, or other object to find visually similar images and locate matches in a collection even if they do not share metadata with the original image.

Browsing provides an effective means for exploratory search and a useful alternative to traditional content-based retrieval in which users formulate textual or pictorial queries. In addition, when exploring image and/or multimedia collections, users' intentions might be very vague. They expect the system to be able to provide a variety of cues and options to guide their navigation.

Image and/or multimedia browsing systems need to enable users to visualize collections of items (or their thumbnails or icons) by laying them out appropriately for display. Many systems categorize items into different classes and simply lay them out on a 2D display as 1D lists for each class (Kang, H. and Shneiderman, B. (2000). Visualization methods for personal photo collections browsing and searching in the photofinder. In *IEEE International Conference on Multimedia and Expo*, pages 1539-1542.). Such 1D lists do not portray well the mutual relationships between items.

Alternatively, 2D map based visualizations (for example, Nguyen, G. and Worring, M. (2006). Interactive access to large image collections using similarity-based visualization. *Journal of Visual Languages and Computing*, 19(2):203-224) lay out items such that similar items appear close to one another on a 2D display while very different images will be further apart. The 2D map based techniques differ in the manner by which they extract high-dimensional feature vectors from items, measure pair-wise item similarity, and perform dimensionality reduction to map the distribution of items from the high-dimensional space to a 2D display space (Rodden, K. (2002). *Evaluating similarity-based visualisations as interfaces for image browsing*. PhD thesis, University of Cambridge.).

For example, Rubner et al (Rubner, Y., Tomasi, C., and Guibas, L. (1998). A metric for distributions with applications to image databases. In ICCV, pages 59-66, Bombay, India) used Earth Mover's Distance to measure pair-wise dissimilarity and performed multi-dimensional scaling (MDS) to transform image colour and texture features to a 2D space.

When a large number of items are visualized on a display for browsing, the items will overlap and the extent of this overlap will tend to increase with the number of items. Additionally, regions of the display space will often be empty. These problems are exacerbated by dimensionality reduction techniques that do not consider the sizes of the images used to represent the items (e.g. image thumbnails or icons) when mapping to display positions. Two very similar items will probably be projected to very close positions such that one will be heavily overlapped by the other. In order to reduce overlap, after obtaining image positions on a 2D display by dimensionality reduction, gradient descent methods have been used to move overlapped images towards unoccupied 2D display regions. Basalaj (Basalaj, 2000) and Liu et al. (Liu et al., 2004) used an analogue of MDS in a discrete domain to display each image within a single cell of a grid. While these approaches can help to reduce image overlap, they mainly deal with small numbers of images (about 20~200).

It is an object of the invention to improve the manner in which items on a display are laid out or arranged.

SUMMARY OF THE INVENTION

In accordance with a first aspect of the invention there is provided a system for arranging searchable items such as digital images or multimedia icons for display, the system comprising:
an Optimizer module which:
  minimises a cost function for arranging items in a layout space, the cost function being applied to one or more predetermined characteristics of the items; creates a mixture distribution by considering each item as having a spatial distribution in the layout space; and
  controls the entropy of the mixture distribution in order to maximise the extent to which each item occupies a separate position in the layout space;
a Renderer module that renders layouts so generated to a display.

Preferably, the cost function penalises low entropy mixture distributions and rewards layouts in the layout space in which the distances between items depend upon the similarity of their content.

Preferably, the layout space comprises one or more layout regions in which items are contained.

Preferably, the spatial distribution of each item in layout space is a Gaussian distribution.

Preferably, the Gaussian distribution is a Gaussian mixture distribution.

Preferably, the mixture distribution has equal weights for each Gaussian component.

Preferably, the items are laid out on the basis of content similarity.

Preferably, the predetermined characteristics are features describing aspects such as colour, texture, and/or shape.

Preferably, size and shape information of each item's thumbnail or icon can be embedded into the cost function.

Preferably, the entropy is the quadratic Renyi entropy.

Preferably, the step of processing the items comprises;
assuming that the items are distributed on a data manifold;
determining the structure of the data manifold;
  and applying a manifold learning technique to map items to a low-dimensional layout space so as to approximately preserve the content structure of the items.

Preferably, the cost function is further adapted to trade off the entropy and the content structure preservation of the items in the layout space.

Preferably, the parameter controlling the trade-off is user defined. Advantageously, this will allow the user to experiment trading off content structure preservation and layout entropy.

Preferably, the items are arranged in 2-D on the display.

Alternatively, the items are positioned to give the appearance of a 3-D arrangement on a 2-D display.

Alternatively, the items are arranged in 3-D on a 3-D display.

Preferably, the display comprises a display space which can be a part of a display such that the items are spread out within the display space.

Preferably, the items are images or their thumbnails.

Alternatively, the items are icons for multimedia items such as audio or video clips.

Preferably, the optimizer module comprises a number of sub-modules.

Preferably, the optimizer module comprises an initializer module which generates an initial layout of the items.

Preferably, the optimizer module comprises a Search Engine which searches for an optimal layout based on the cost function.

Preferably, the cost function is computed as a combination of layout quality scores computed by a Multimedia content module a Layout spread module and a Layout extent module.

Preferably, the multimedia content submodule computes a score that measures the extent to which content structure is preserved by the layout.

Preferably, the Layout spread submodule computes a score that measures the entropy of the layout.

Preferably, the Layout extent submodule computes a score that measures the extent to which the constraint that the items are positioned within the layout region or regions is satisfied.

Preferably, the optimizer module further comprises a combiner module which combines these scores into an overall score which the Search engine uses as a cost function value for the layout.

Preferably, the search engine applies an optimisation method to propose layouts to be scored.

Preferably, the search engine outputs an optimised layout after a number of iterations in which layouts are proposed and scored.

In accordance with a second aspect of the invention there is provided a method for arranging searchable items such as digital images or multimedia icons for display, the method comprising:
creating mixture distributions by considering each item as having a spatial distribution in the layout space; and minimising a cost function for arranging items in the layout space, the cost function being applied to one or more predetermined characteristics of the items;
controlling the entropy of the mixture distribution in order to maximise the extent to which each item occupies a separate position in the layout space; and
rendering the layouts so generated to a display.

Preferably, the cost function penalises low entropy mixture distributions and rewards layouts in which the distances between items on the layout depend upon the similarity of their content.

Preferably, the layout space comprises one or more layout regions in which items are contained.

Preferably, the spatial distribution of each item in layout space is a Gaussian distribution.

Preferably, the mixture distribution is a Gaussian mixture distribution.

Preferably, the mixture distribution has equal weights for each Gaussian component.

Preferably, the items are laid out on the basis of content similarity.

Preferably, the predetermined characteristics of the item are features describing aspects such as colour, texture, and/or shape Preferably, shape information of each item's thumbnail or icon can be embedded into the cost function.

Preferably, the entropy is the quadratic Renyi entropy.

Preferably, the step of processing the items comprises;
assuming that the items are distributed on a data manifold;
determining the structure of the data manifold;
and applying a manifold learning technique to map items to a low-dimensional layout space so as to approximately preserve the content structure.

Preferably, the cost function is further adapted to trade off the entropy and the content structure preservation of the items in the layout space.

Preferably, the parameter controlling the trade-off is user defined. Advantageously, this will allow the user to experiment trading off content structure preservation and layout entropy.

Preferably, the items are arranged in 2-D on the display.

Alternatively, the items are positioned to give the appearance of a 3-D arrangement on a 2-D display.

Alternatively, the items are arranged in 3-D on a 3-D display.

Preferably, the display comprises a display space which can be a part of a display such that the items are spread out within the display space.

Preferably, the items are images or their thumbnails.

Alternatively, the items are icons for multimedia items such as audio or video clips.

In accordance with a third aspect of the invention there is provided a browser comprising:
a user interface with a display;
computing means adapted to run computer software for arranging searchable items such as digital images or multimedia icons on the display screen, the computer software comprising:
an Optimizer module which:
  minimises a cost function for arranging items in a layout space, the cost function being applied to one or more predetermined characteristics of the items; creates a mixture distribution by considering each item as having a spatial distribution in the layout space; and
  controls the entropy of the mixture distribution in order to maximise the extent to which each item occupies a separate position in the layout space;
a Renderer module that renders layouts so generated to a display.

Preferably, the cost function penalises low entropy mixture distributions and rewards layouts in which the distances between items on the layout depend upon the similarity of their content.

Preferably, the layout space comprises one or more layout regions in which items are contained.

Preferably, the spatial distribution of each item in layout space is a Gaussian distribution.

Preferably, the mixture distribution is a Gaussian mixture distribution.

Preferably, the mixture distribution has equal weights for each Gaussian component.

Preferably, the items are laid out on the basis of content similarity.

Preferably, the predetermined characteristics of the items are features describing aspects such as colour, texture, and/or shape Preferably, shape information of each item's thumbnail or icon can be embedded into the cost function.

Preferably, the entropy is the quadratic Renyi entropy.

Preferably, the step of processing the items comprises; assuming that the items are distributed on a data manifold; determining the structure of the data manifold;

and applying a manifold learning technique to map items to a low-dimensional layout space so as to approximately preserve the content structure.

Preferably, the cost function is further adapted to trade off the entropy and the content structure preservation of the layout in the layout space.

Preferably, the parameter controlling the trade-off is user defined. Advantageously, this will allow the user to experiment trading off content structure preservation and layout entropy.

Preferably, the items are arranged in 2-D on the display.

Alternatively, the items are positioned to give the appearance of a 3-D arrangement on a 2-D display.

Alternatively, the items are arranged in 3-D on a 3-D display.

Preferably, the optimizer module comprises a number of sub-modules.

Preferably, the optimizer module comprises an initializer module which generates an initial layout of the items.

Preferably, the optimizer module comprises a Search Engine which searches for an optimal layout based on the cost function.

Preferably, the cost function is computed as a combination of layout quality scores computed by a Multimedia content module a Layout spread module and a Layout extent module.

Preferably, the multimedia content submodule computes a score that measures the extent to which content structure is preserved by the layout.

Preferably, the Layout spread submodule computes a score that measures the entropy of the layout.

Preferably, the Layout extent submodule computes a score that measures the extent to which the constraint that the items are positioned within the layout region or regions is satisfied.

Preferably, the optimizer module further comprises a combiner module which combines these scores into an overall score which the Search engine uses as a cost function value for the layout.

Preferably, the search engine applies an optimisation method to propose layouts to be scored.

Preferably, the search engine outputs an optimised layout after a number of iterations in which layouts are proposed and scored.

BRIEF DESCRIPTION OF THE DRAWINGS

The present invention will now be described by way of example only with reference to the accompanying drawings in which:

FIG. 1(a) shows the value of a cost function with respect to iteration number, FIGS. 1(b) and 1(c) show visualizations of an image collection based on the initial image positions and the positions after convergence;

FIGS. 4a to 4i show visualisations of 1000 art images in which FIGS. 4a to 4c show the distributions of initial image positions, of the positions by a trade off between structure preservation and image overlap, and of the positions by focusing only on image overlap reduction. FIGS. 4d, 4f and 4h show the visualizations of the image collection corresponding to the positions in FIGS. 4a, 4b, 4c, whereas images 4e, 4g and 4i show the visualisations of part of the image collection after scaling the image positions around an image at the centre of layout space; and FIGS. 5a to 5i show visualisations of 1000 art images in which FIGS. 5a to 5c show the initial image positions, of the positions by a trade off between content structure preservation and entropy, and of the positions by focusing only on entropy. FIGS. 5d, 5f and 5h show the visualizations of the image collection corresponding to the positions in FIGS. 5a, 5b, 5c, whereas images 5e, 5g and 5i show the visualisations of part of the image collection after scaling the image positions around an image at the centre of layout space.

DETAILED DESCRIPTION OF THE DRAWINGS

Figure 1A:
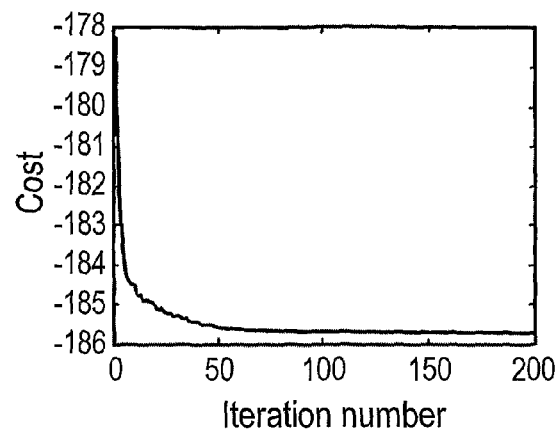
FIGS. 1a to 1c show the convergence of item data using an example of a system in accordance with the present invention, in particular

The present invention provides a system, method and browser that allow items to be arranged for display based on their content similarity. The invention can be used to arrange items such as images according to features of their content (such as shape, colour, texture and pattern) And such that distances between items on in a display are related to the similarity between them in terms of these features.

The first stage in this process is to compute the layout of the items in a layout space. Once the layout has been computed it can be used to produce renderings of the items for display on a device such as a computer screen. Not all of the layout space need be mapped to a display at any one time. For example, a user might want to view a small part of the layout in detail, in which case only items located in that small part of the layout would actually be rendered onto the display space/window.

It will be appreciated that the terms layout, layout region and layout space refer to processed data relating to items before the data has been rendered into a viewable display image.

In at least one example of the invention the purpose is to make "good" use of the layout space by:
laying out the items approximately uniformly so that effective use is made of the available layout region; Keeping the items within the bounds of the available layout region (which might be circular, rectangular, or annular for example); and
laying out the items in a way that depends on their content, typically such that similar items are close to one another (herein referred to as "content structure preservation").

The invention optimises a cost function and uses a mixture model formed in the layout space by associating each item with a component in the mixture model. Maximising the entropy of this mixture model has the effect of spreading the images out in the layout space to occupy a predetermined layout region. In particular, each item can be associated with a Gaussian with a covariance matrix determined by the spatial extent of the item, and the quadratic Renyi entropy computed and optimised efficiently.

Without wishing to be bound by theory, the following explanation of the mathematical description by which at least the following embodiments of the invention operate, is given.

Given a set of items $\{I_i\}$, i=1, ..., N, with extracted high-dimensional feature vectors $\{x_i\}$ and image (or thumbnail or icon) sizes $\{s_i\}$, the problem of interest is to lay out the items in a predetermined region or regions of a layout space by trading off two requirements: (1) the distance between items in the layout space should depend on the similarity of their content, and (2) items should spread out so as to make good use of the layout region.

The first requirement can be achieved by manifold learning. By assuming that the items are distributed on a lower-dimensional nonlinear manifold embedded in the high-dimensional space, manifold learning techniques can be applied to detect and discover the structure of the data manifold and unfold the manifold into a vector space. Once the original high-dimensional data points can be faithfully embedded into the lower-dimensional vector space, the relative proximity of images in the database will be approximately preserved in the lower-dimensional (e.g., 2D or 3D) space. This is referred to as content structure preservation.

A large collection of high-dimensional items can be visualized in a 2D or 3D space for browsing, exploration, and organization. According to the criteria used for manifold structure and structure preservation, many different manifold learning techniques have been proposed, e.g., Isomap (Tenenbaum et al., 2000), Laplacian eigenmaps (Belkin and Niyogi, 2002), diffusion maps (Nadler et al., 2005), and maximum variance unfolding (Weinberger et al., 2005). In principal, any manifold learning technique can be used. Here Isomap is used as an example. Isomap first constructs a sparse graph based on $\{x_i\}$ in which there is a one-to-one correspondence between items and vertices in the graph.

Edges are constructed between similar items by the K-nearest neighbor (KNN) method. Each edge is assigned a weight $W_{ij}$ which is the dissimilarity between the two neighboring items. An approximation, $D_{ij}$, to the geodesic distance between any two items is then obtained as the shortest path between their corresponding vertices on the graph. Without loss of generality, $\{D_{ij}\}$ are normalized such that the maximum $D_{ij}$ is limited by the layout region size. Isomap can determine image positions $\{y_i\}$ in the lower-dimensional (e.g., 2D or 3D) vector space by minimizing $E_s$:

$$E_s = \Sigma_{i=1}^N \Sigma_{j=1}^N (d_{ij} - D_{ij})^2 \qquad (1)$$

where $d_{ij}$ is the Euclidean distance between $y_i$ and $y_j$.

Note that when two items $I_i$ and $I_j$ are similar in content, the distance $D_{ij}$ between them will be small and accordingly the two items in the lower-dimensional space will probably appear close to each other.

For the second requirement, we propose a method to measure the quality of item spread in the layout region in terms of entropy. Given an image position $y_i$ in the lower-dimensional layout region, a Gaussian distribution $G(y_i, \Sigma_i)$ is used to approximate the spatial distribution of this image in the space, where $\Sigma_i$ is determined by item size and shape, the number of images, and the size of the layout region. Then, the Gaussian distributions of all the items to be arranged in the layout region can be combined to obtain a Gaussian mixture with equal weight for each Gaussian component, i.e., $$p(y) = \frac{1}{N} \sum_{i=1}^{N} G\left(y - y_i, \Sigma_i\right) \qquad (2)$$

In order to spread out items in a layout region R, the entropy of the Gaussian mixture in the layout space can be maximised. Instead of traditional Shannon entropy, the use of Renyi's quadratic entropy measure is proposed here. The quadratic Renyi entropy, H, of a Gaussian mixture can be efficiently estimated as a sum of pair-wise measures between Gaussian components (Torkkola, 2003), i.e., $$H = -\log\left\{\frac{1}{N^2} \sum_{i=1}^{N} \sum_{j=1}^{N} G\left(y_i - y_j, \Sigma_i + \Sigma_j\right)\right\} \qquad (3)$$

The region, R, can be used well by maximizing H (or minimizing −H). This has the effect of arranging items so that the amount of empty space is kept small and the overlap between items is kept small, and so items are spread more uniformly over the region. The two requirements have to be traded off. That means, the problem is to minimize $E_\lambda$, $$E_\lambda = (1-\lambda)E_s - \lambda H, \qquad (4)$$

subject to the constraint that each item should stay within the region R, and where $\lambda \in [0,1]$ is a trade-off parameter. $\lambda$ should be determined in an application dependent way. When $\lambda$ is close to 0, the emphasis is on preserving manifold structure. When $\lambda$ is close to 1, the emphasis is on maximising entropy.

This optimisation problem can be solved using any number of well known optimisation methods. Here we use a penalty function method to penalise item positions outside R. Intuitively, the larger the Euclidean distance from the item position $y_i$ to the layout region R, the worse the item is positioned, and therefore the higher the penalty. Denote by $E_b$ the mean penalty cost of all image positions, i.e., $$E_b = \frac{1}{N} \sum_{i=1}^{N} f(y_i), \quad (5)$$

where $f(y_i)$ is a monotonically increasing non-negative function of the Euclidean distance (i.e., $\min_{y \in R} \|y - y_i\|$) from $y_i$ to the layout region R. Then, the problem can be finally transformed to minimize E, $$E = E_\lambda + \gamma E_b, \quad (6)$$

where $\gamma$ is a constant to balance $E_\lambda$ and $E_b$.

Gradient-based optimisation can be used to find a (local) minimum of E. From Equation (4), $$\frac{\partial E}{\partial y_j} = (1-\lambda)\frac{\partial E_s}{\partial y_j} - \lambda \frac{\partial H}{\partial y_j} + \gamma \frac{\partial E_b}{\partial y_j} \quad (7)$$

The gradient of $E_s$ with respect to $y_j$ has been derived by Kruskal (Cox and Cox, 2001):

$$\frac{\partial E_s}{\partial y_j} = -2\sum_{i \neq j} \frac{(d_{ij} - D_{ij})}{d_{ij}} \cdot (y_i - y_j) \quad (8)$$

From Equation (3), we can derive the gradient of H with respect to $y_j$:

$$\frac{\partial H}{\partial y_j} = -\frac{1}{\alpha}\sum_i \left\{ G\left(y_i - y_j, \sum_i + \sum_j\right)\left(\sum_i + \sum_j\right)^{-1}(y_i - y_j)\right\} \quad (9)$$

where $\alpha = \Sigma_i \Sigma_j G(y_i - y_j, \Sigma_i + \Sigma_j)$.

For the gradient of $E_b$ with respect to $y_j$, a discrete approximation is adopted because, in general, it is difficult to parametrically represent the function $f(y_i)$ due to the freeform shape of the layout region. In the approximation, the k-th component of the gradient of $E_b$ with respect to $y_j$ is computed by $$\frac{\partial E_b}{\partial y_{jk}} \doteq \frac{1}{N} \sum_{i=1}^{N} \frac{f(y_j + \delta u_k) - f(y_j)}{\delta} \quad (10)$$

where $\delta$ is the discrete unit scale and $u_k$ is the basis vector for the k-th dimension of the layout region.

For optimisation, good initial item positions $\{y_i\}$ can be easily obtained by minimizing $E_s$ using the Isomap algorithm.

The method is not limited by the dimensionality of the layout region, nor by the shapes of the items. However, in order to experimentally evaluate it, in the following, we consider a 2D layout region and each image $I_i$ is assumed to be rectangular with height $h_i$ and width $w_i$. In this case, the covariance matrices $\Sigma_i$ are diagonal, i.e., $$\sum_i = \begin{pmatrix} \sigma_{i1}^2 & 0 \\ 0 & \sigma_{i2}^2 \end{pmatrix} \quad (11)$$

Note that $\sigma_{i1}$ and $\sigma_{i2}$ should not be very small or very large because in both cases, H (Equation 3) will converge to a constant function and therefore the image layout cannot be effectively spread. Here we propose a method to automatically determine $\sigma_{i1}$ and $\sigma_{i2}$ by image sizes, layout region size, and the number of images to spread out, i.e., $$\sigma_{i1} = \frac{w_i}{2} \cdot \sqrt{\frac{|R|/N}{\overline{w} \cdot \overline{h}}} \quad (12)$$

$$\sigma_{i2} = \frac{h_i}{2} \cdot \sqrt{\frac{|R|/N}{\overline{w} \cdot \overline{h}}}$$

where $|R|$ is the area of the layout region, and $\overline{w}$ and $\overline{h}$ are the mean width and height of all images to spread out.

$$\sqrt{\frac{|R|/N}{\overline{w} \cdot \overline{h}}}$$

is a global scale for each item such that the combination p(y) (Equation 2) of all items' spatial distributions can effectively cover the layout region for spreading out the items to an approximately uniform distribution. For a fixed layout region R, the greater the number of items and the larger the mean item size, the smaller the global scale. For a fixed set of items, the larger the layout region, the larger the global scale. Every pair ($\sigma_{i1}, \sigma_{i2}$) is linearly related to the corresponding item size and the global scale.

The performance of the present invention is now described with reference to its use on a number of image databases including two image databases, the first having 1000 images of textile designs from a commercial archive and a second which comprises 1000 art images from a public museum collection. Two kinds of features were used to represent images. Colour histograms with 512 bins were extracted by regularly quantizing hue into 32 values and saturation into 16 values in the HSV color space. Texture features were extracted by performing multi-resolution Gabor transformation and then computing the mean and variance of the coefficients of the transformation at each level of image resolution, giving 108 texture features.

For both kinds of features, Euclidean distance was used to determine the nearest neighbors for constructing the manifold structure. In the tests, the default layout region size was $\sigma_d = \sqrt{|R|} = 1$, and each image $I_i$ was resized such that the maximum of its height and width was a pre-set value $s_{max} = 0.08$. In addition, in order to quantitatively and qualitatively compare the proposed algorithm with two existing ones, $\gamma = 0$ in Equation 4 because $E_b$ was not used in existing algorithms. In this case, for each $\Sigma_i$, $\sigma_{i1} = w_i/2$ and $\sigma_{i2} = h_i/2$ without global scaling.

In the evaluation, the performance of the structure preservation was measured by structure error $e_s$, $$e_s = \min_\beta \{\Sigma_{i=1}^N \Sigma_{j=1}^N (\beta \cdot d_{ij} - D_{ij})^2\} \quad (13)$$

where the normalization factor $\beta$ with minimum $e_s$ can be analytically computed, $$\beta = \frac{\sum_{i=1}^{N}\sum_{j=1}^{N} d_{ij} \cdot D_{ij}}{\sum_{i=1}^{N}\sum_{j=1}^{N} d_{ij}^2} \qquad (14)$$

$\beta$ is necessary to compute $e_s$ because, intuitively, the structure of the image distribution should be the same if all $d_{ij}$ are scaled by the same amount.

The second measurement for evaluation is the overall image overlap $e_o$, which is the sum of all pair-wise image overlap $\sqrt{z_{ij}}$ in the display space, i.e., $$e_o = \sum_{i=1}^{N}\sum_{j=1}^{N} \sqrt{z_{ij}}, \qquad (15)$$

where the area $z_{ij}$ of the overlap region can be directly computed from the image positions, $y_i$ and $y_j$, and the image sizes, $(w_i, h_i)$ and $(w_j, h_j)$. Note that before computing image overlap $e_o$, all $y_i$'s and $y_j$'s have to be normalized such that all images are positioned in the default display space $\sigma_d=1$.

Figure 1B:
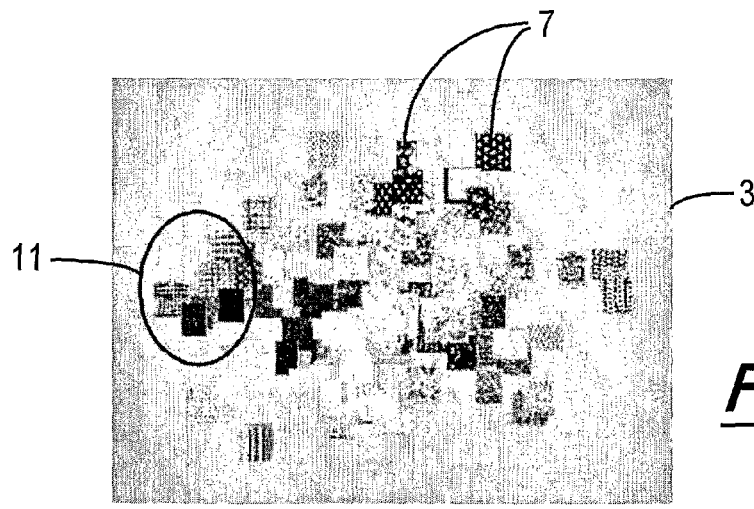

With reference to the attached figures, a first example comprising 100 images were uniformly sampled from the set of fabric images as shown in FIGS. 1a and 1b. Each image was represented by the Gabor features, and $\lambda$ was set to 0.5.

FIG. 1a is a graph 1 that illustrates the value of the cost function with respect to the iteration number. It shows that the cost value decreased to a stable value after about 70 iterations.

Figure 1C:
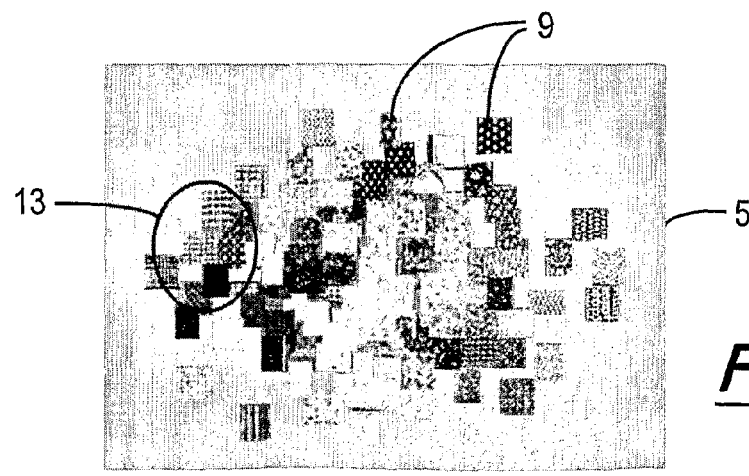

FIGS. 1b and 1c are the visualizations of all the 100 images based on the initial image positions and the positions after convergence. The images are of patterned pieces of fabric on a grey background. Both FIGS. 1b and 1c contain the same number of fabric images. FIG. 1b shows the images clustered together at the centre of the layout space 3, whereas the images in FIG. 1c are clearly more spread out across the layout space 5. This can be seen from a visual comparison of the layout spaces in FIGS. 1b and 1c and noting that a greater area of the layout space is covered by images in FIG. 1c. In other words, the visualizations show that image overlap has been reduced to some extent, while the position distribution of images remains quite similar. For example, the images 7 and 9 from FIGS. 1b and 1c have remained in the same position and the overlaps between the several images near the left display boundary denoted by reference numerals 11 and 13 have largely reduced while they are still close to each other.

An embodiment of the system and method of the present invention was quantitatively and qualitatively compared with two existing algorithms in balancing image overlap and structure preservation: Moghaddam's algorithm (Moghaddam et al., 2004) and Nguyen's algorithm (Nguyen and Worring, 2006). For fair comparison, the same $E_s$ was used for structure preservation in the cost function of each of the three methods. In both Moghaddam's method and Nguyen's method, each image was approximated by a circular image with radius $s_{max}/2$. The same 100 images and Gabor features were used as above. The trade-off parameter $\lambda$ was gradually varied from 0 to 1. For every $\lambda$ value, the structure error $e_s$ and overlap $e_o$ were measured based on the convergent result of each algorithm.

Figure 2:
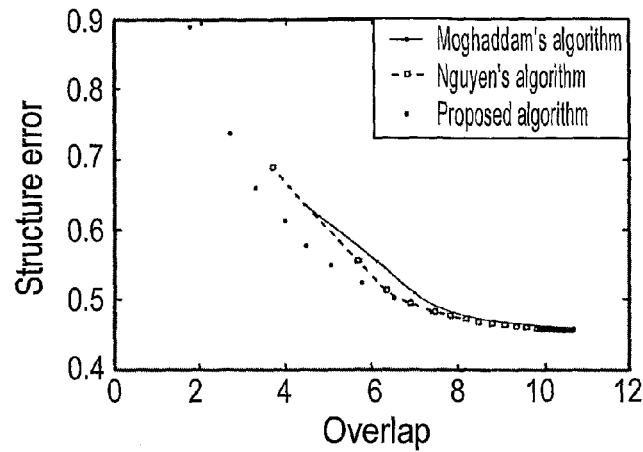
FIG. 2 is a graph which shows the relationships between content structure error and image overlap using a method of the present invention and prior art alternative methods, namely Moghaddam's method and Nguyen's method.
Figure 3A:
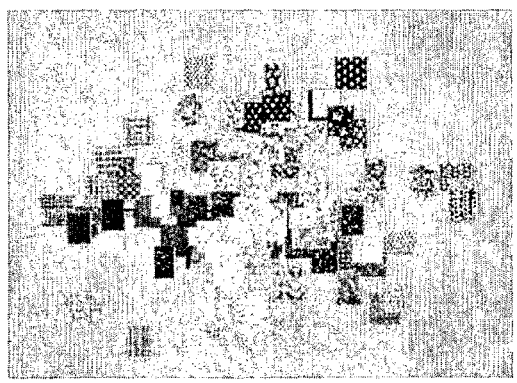
FIGS. 3a to 3d show visualisations of 100 images using isomap, Moghaddam's method, Nguyen's method and an example of the method of the present invention, respectively.
Figure 3B:
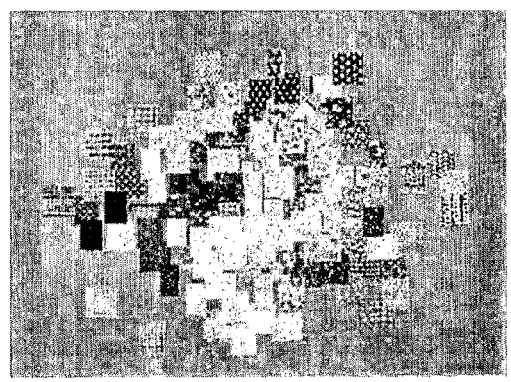
Figure 3C:
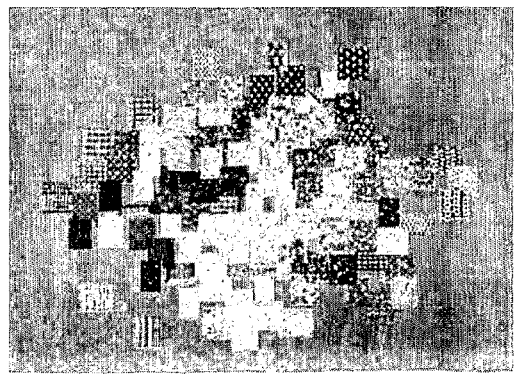
Figure 3D:
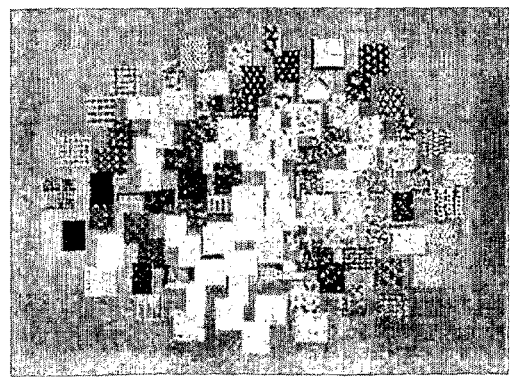

From the relationships between structure preservation and overlap as shown in FIG. 2, we can see that for any given structure error, this method of the present invention can always obtain equivalent or less image overlap than the other two algorithms. In addition, the minimum image overlap (i.e., ~2) obtained by the method of the present invention is much less than those (i.e., ~4.5 and ~4 respectively) obtained by the other two methods. This can be perceptually verified from the corresponding visualizations of the image collection (FIG. 3). Compared to the initial visualization obtained by Isomap as shown in FIG. 3a there was much less image overlap in the visualizations obtained by Moghaddam's method and Nguyen's method (FIGS. 3(b) and (c)). However, the smallest image overlap appears in the visualization obtained by the method of the present invention as shown in FIG. 3(d). It can be seen that, in FIG. 3(d), almost every image is clearly visualized with very small overlap by other images. It is submitted that this embodiment of the method of the present invention performs better probably because of the following two reasons.

Firstly, both width and height of each image are embedded in the cost function, by which the pair-wise image overlap can be more effectively approximated. In the two previous methods, each image was approximated by a circular image. Secondly, in the proposed cost function (Equation 5), the cost term $-H$ is smooth and has a larger region of effect on the pair-wise distance. In comparison, the cost terms for image overlap in both previous methods are piecewise smooth functions with no effect on pair-wise distance when there is no image overlap between two images, making it difficult to find a good minimum.

The performance of the algorithm for large collections of images was tested using the two sets of 1000 images. Gabor features were used to represent the fabric images and colour histograms were used to represent the art images.

Figure 4A:
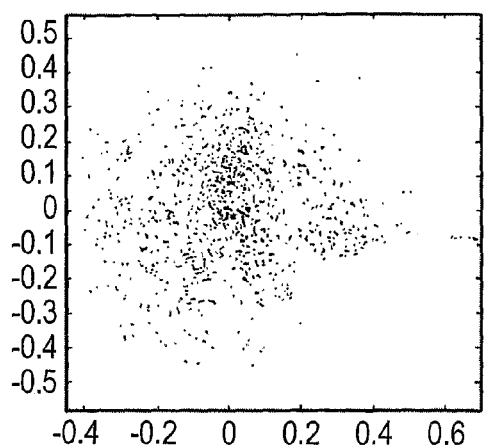
Figure 4B:
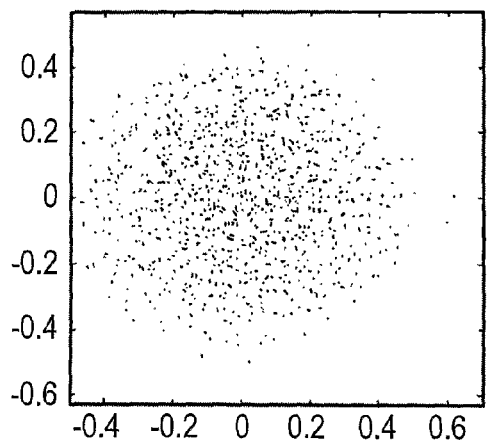
Figure 4C:
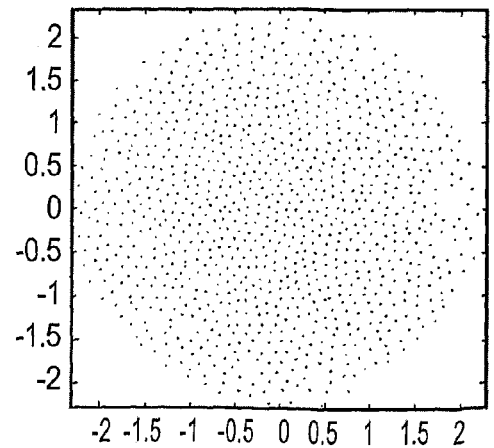

FIGS. 4a to i illustrate the image positions and the corresponding image visualizations in the 2D display for the art image set. In the initial image distribution obtained by Isomap shown in FIG. 4a, most images are clustered around the display centre and a few images are irregularly distributed at boundaries. By trading off the structure preservation and image overlap, the images are more uniformly distributed without strong clusters as shown in FIG. 4b. If image overlap reduction is emphasised (i.e., $\lambda=1$), the images are most uniformly separated from their neighbours as shown in FIG. 4c.

Figure 4D:
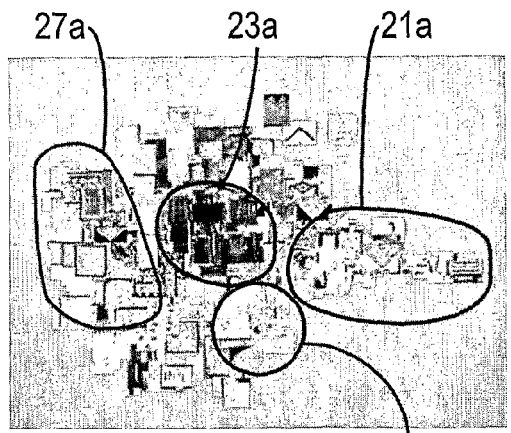
Figure 4E:
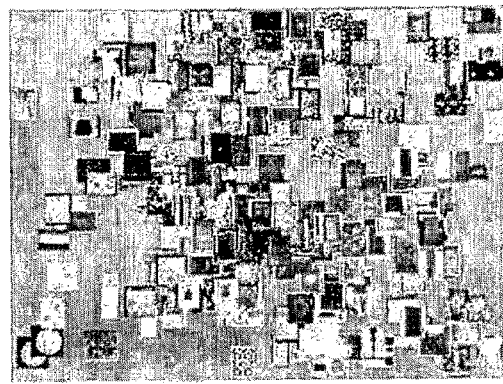
Figure 4F:
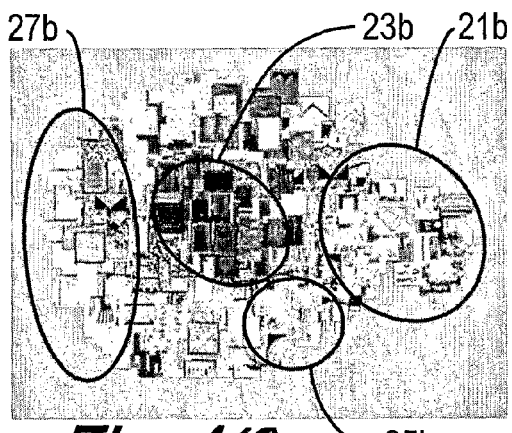
Figure 4G:
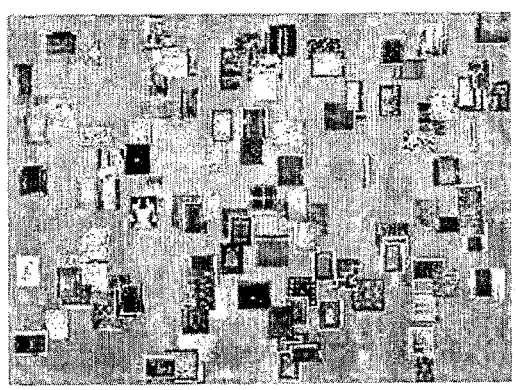
Figure 4H:
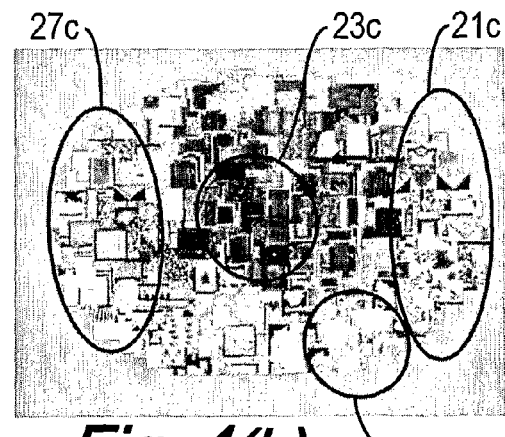

The corresponding image visualizations shown in FIGS. 4d, 4f and 4h show that similar images are still positioned close to one another when the requirement of structure preservation is relaxed. In this black and white version of the images, different coloured areas are represented by reference numerals 21 a-c, 23 a-c, 25 a-c and 27 a-c.

Figure 4I:
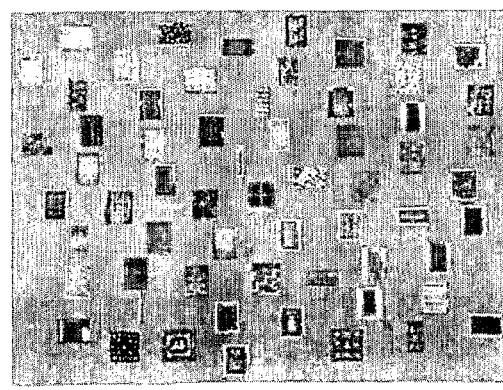

In order to show the effect of the method of the present invention on image overlap reduction, the three distributions are zoomed in around one image near the display centre and then the corresponding visualizations are shown in FIGS. 4e, 4g and 4i. Note that the image positions are scaled by the zoom operation but the images themselves are not. FIGS. 4(e), (g) and (i) clearly show that the image overlap can be effectively reduced by the method of the present invention.

In image browsing, the present invention can provide an effective way for users to zoom in on a large collection of images to view image details with less image overlap.

FIG. 5 illustrates the image positions and corresponding image visualizations for the textile images, and the zoom-in visualizations around an image near the display centre produced by scaling the coordinates of the image positions around the selected image. Similar observations can be made as above for the art images. Here the images are distributed according to texture features instead of colour features. From FIGS. 5d, 5f and 5h, we can see that in the areas identified with reference numerals 31 a to c, 33 a to c and 35 a to c, the roughness of image textures changes smoothly from top to bottom in the display space. The smooth change of texture can help users to browse a large collection of images and find images of interest with specific texture information.

Figure 5A:
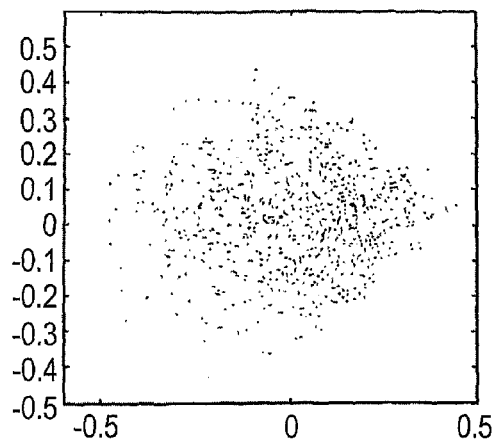
Figure 5B:
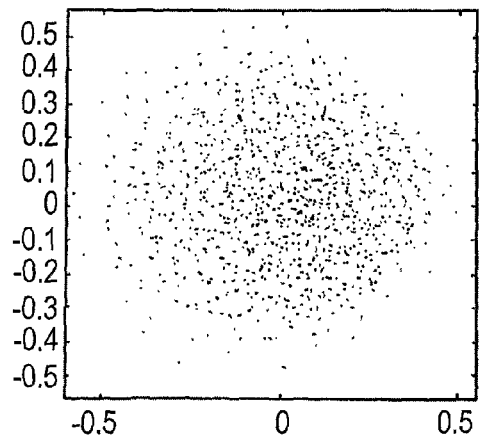
Figure 5C:
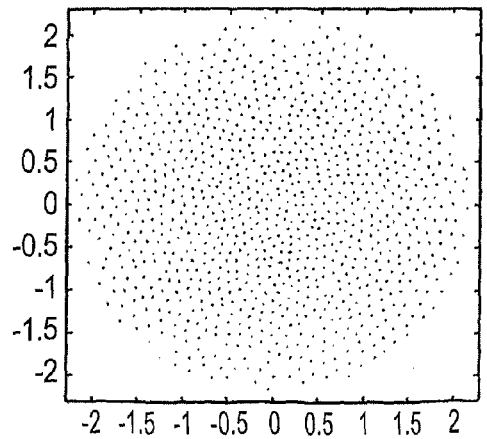
Figure 5D:
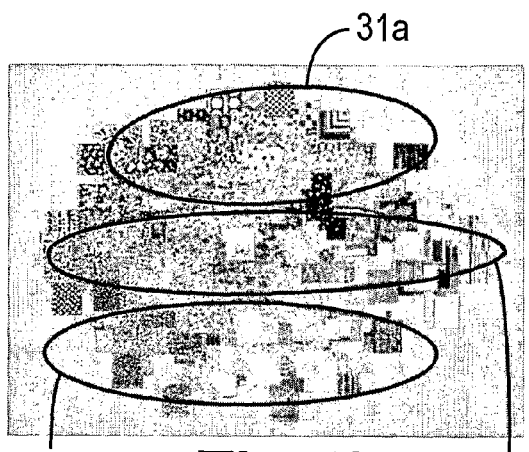
Figure 5E:
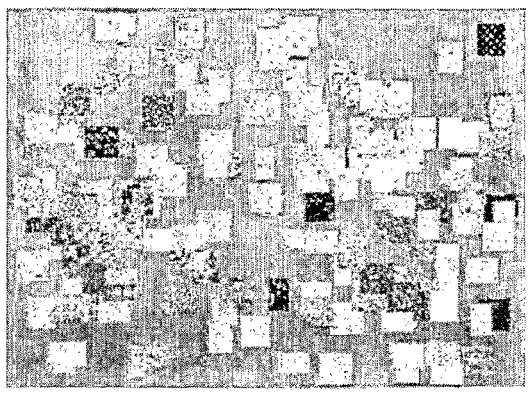
Figure 5F:
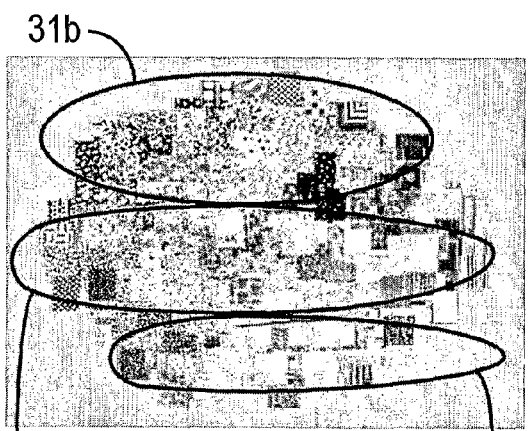
Figure 5G:
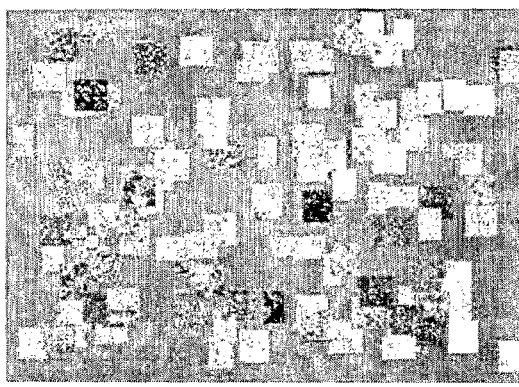
Figure 5H:
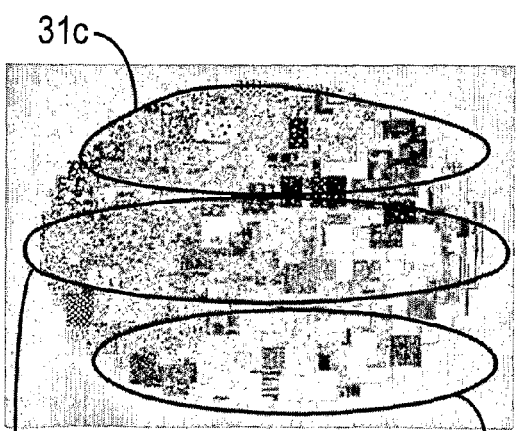
Figure 5I:
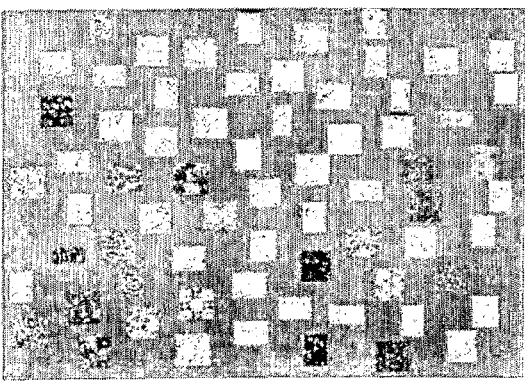

FIGS. 5e, g and i clearly show that the image overlap can be effectively reduced by the method of the present invention.

Figure 6:
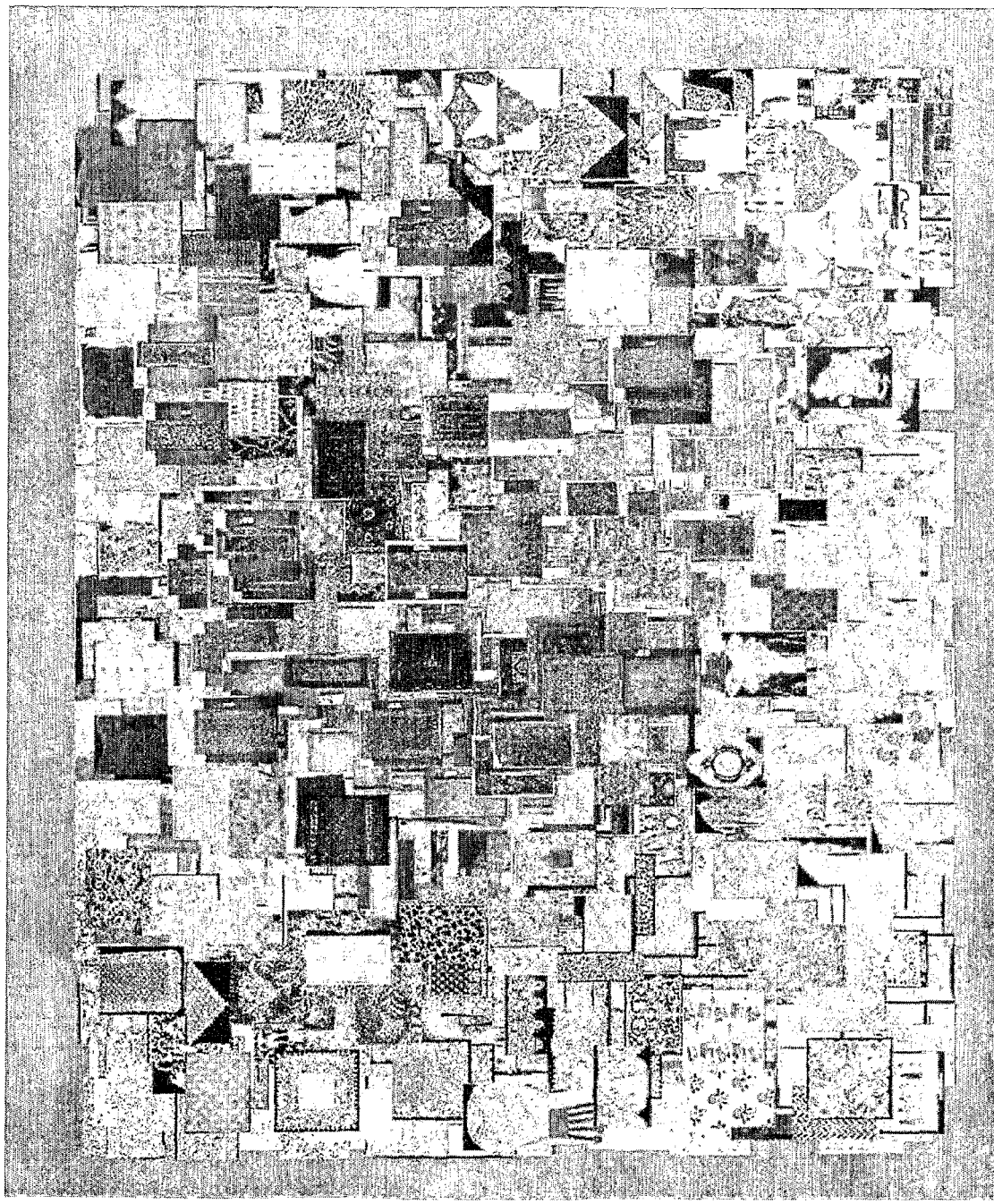
FIG. 6 illustrates the image positions and corresponding image visualizations for the art images by constraining all image positions to lie within a rectangular layout region.
Figure 7A:
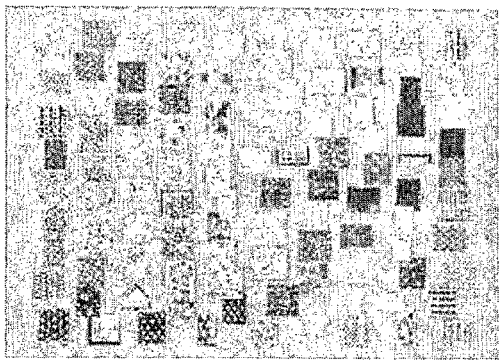
FIG. 7 is another example where textile samples are visualised based upon mage position.
Figure 7B:
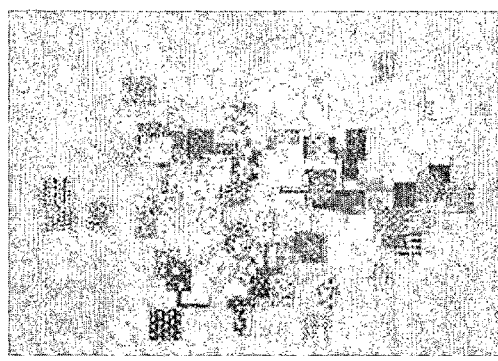
Figure 7C:
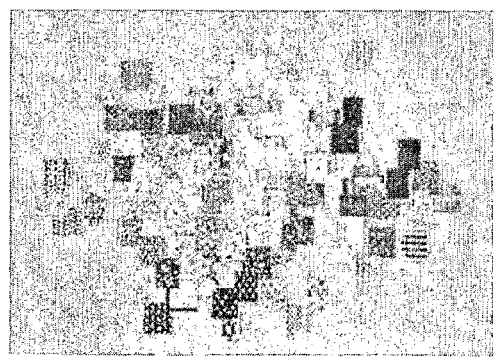
Figure 7D:
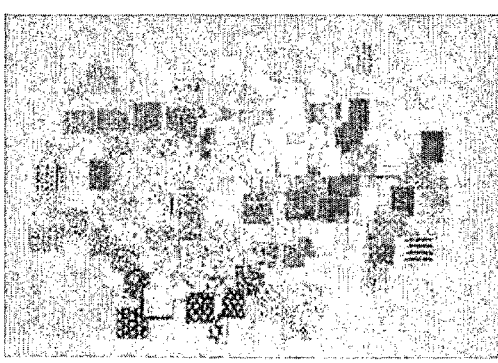
Figure 8A:
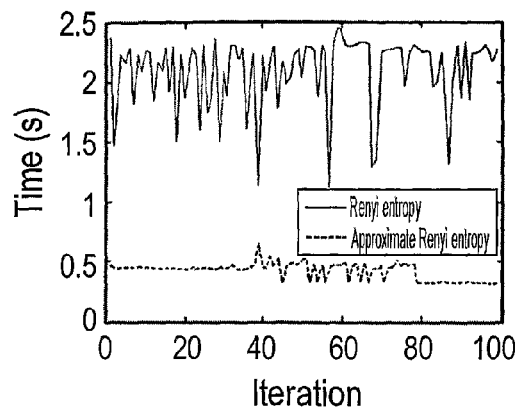
FIGS. 8a and 8b show plots of the time per iteration when optimising a layout of 500 images and the accuracy of the image approximation obtained respectively.
Figure 8B:
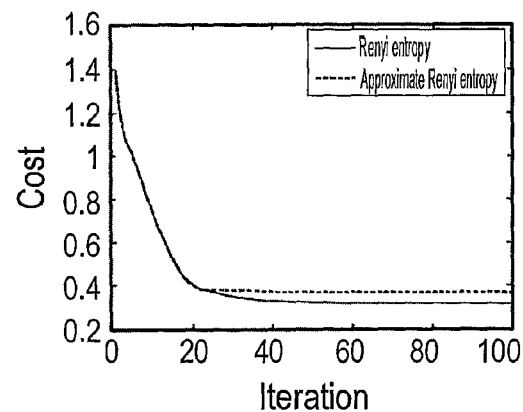
Figure 8C:
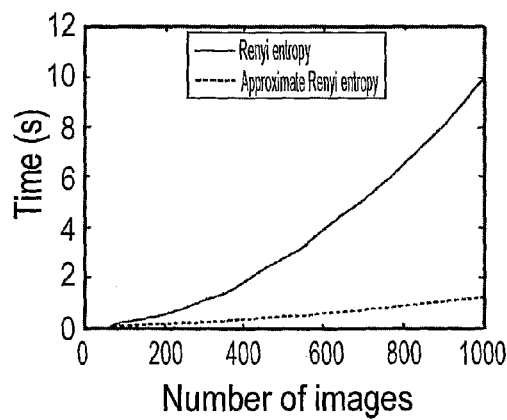
FIG. 8c shows a plot of the average computation time as a function of the number of images in the layout and indicates the improved scaling.
Figure 8D:
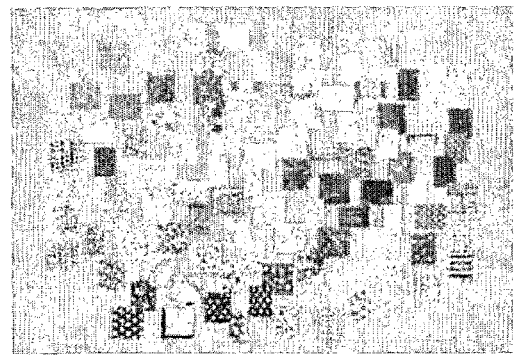
FIG. 8d shows a layout of 100 images obtained using the approximation of the present invention.

All the above experimental results were obtained when γ=0. FIG. 6 illustrates the image positions and corresponding image visualizations for the art images by setting γ=10 which is enough to constrain all image positions in the layout region. Compared to FIGS. 4h and 5h, it shows that the image layouts are more spread out across the entire layout space and therefore the image overlap is reduced.

FIG. 7 is another example where 10 textile samples are visualised based upon image position. FIG. 7a is a visualisation using the present invention, FIG. 7b is a visualisation using Isomap, FIG. 7c uses the technique of Moghaddam et al and FIG. 7d uses the technique of Nguyen et al. The visualisation obtained using the present invention shows almost no image overlap as compared to those produced using prior art techniques as illustrated in FIGS. 7b, 7c and 7d.

The high entropy layout method (HELD) method described herein generates layouts for the items that conform to the available layout region, approximate the high dimensional data distribution and result in rendered displays that are populated evenly with items. The items are taken to form a distribution in the low dimensional layout space. Distributions with low entropy are penalised since they result in layouts which are overpopulated and case other regions to be sparsely populated or empty.

In one aspect, the present invention describes a formulation for content-based visualisation of image collection based on combining existing manifold based learning method with Renyi entropy to create a system and method which arranges the images in a computationally more efficient manner and one in which the images displayed on a graphical user interface are better separated and organised to assist the user in selecting one or more of the items from those displayed upon the screen. In addition, an entropy approximation may be used which involves pairwise measures over a small neighbourhood to increase the efficiency of the system and method.

In this case, the following formula represents the special case where the summation is only over each images' near neighbour. The set of near neighbours of the image i is denoted by F(i)

$$H = -\log\left\{\frac{1}{N^2}\sum_{i=1}^{N}\sum_{j\in F(i)}^{N} G\left(y_i - y_j, \sum_i + \sum_j\right)\right\} \quad (16)$$

The approximation provides a good compromise between reducing computational expense and maintaining accuracy. The set of nearest neighbours to be included in the covariance matrix, specifically, those within $3\sigma_i$ of each images centre.

$$\sum_i = \begin{pmatrix} \sigma_i^2 & 0 \\ 0 & (a\sigma_i)^2 \end{pmatrix} \quad (17)$$

Where a is the aspect ratio of the image As previously described, maximizing Renyi's quadratic entropy will minimise the presence of empty space in the layout region and will minimise image overlap.

FIG. 8 explores the effect of making the approximation on computational time and accuracy. A set of 500 textile images were arranged with and without the approximation and the results were compared. FIGS. 8a and 8b show plots of the time per iteration when optimising a layout of 500 images and the accuracy of the image approximation obtained respectively. FIG. 8c shows a plot of the average computation time as a function of the number of images in the layout and indicates the improved scaling. FIG. 8d shows a layout of 100 images obtained using the approximation of the present invention. Although the approximation arguably produces a slightly inferior layout it is better than the layouts produced by existing known competitor products and uses less computing power.

In order to investigate the effect of the step size a during optimisation, the method of the present invention was applied to the 1000 art images with λ=1.0 and γ=1.0. Each image was represented by a colour histogram and the function $f(y_i)$ of equation 5 was the square of the Euclidean distance from $y_i$ to the layout region R.

Figure 9:
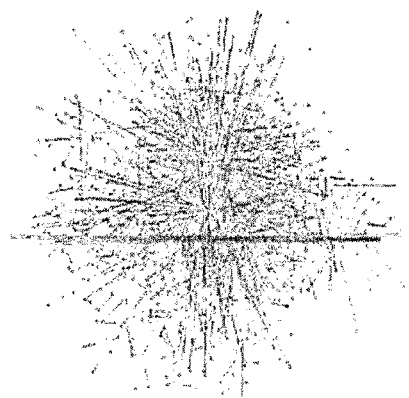
FIG. 9 illustrates the change of image positions in several iterations with no threshold τ on step size (first column) and with a threshold of τ=0.05.
Figure 9:
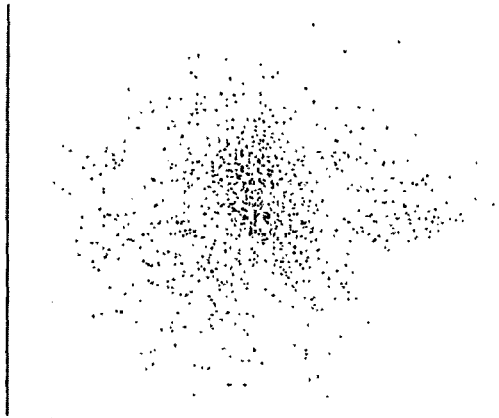
Figure 9:
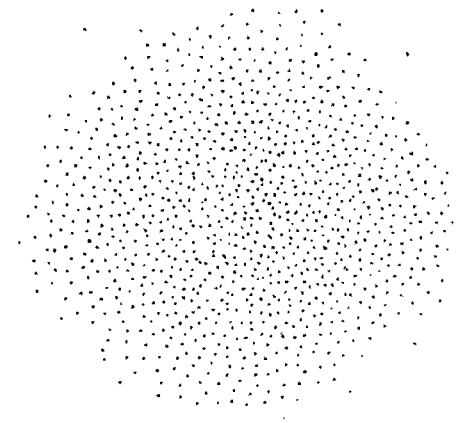
Figure 9:
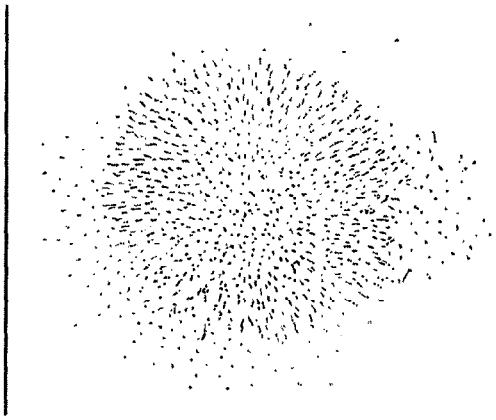

FIG. 9 illustrates the change of image positions in several iterations with no threshold τ on step size (first column) and with τ=0.05 (second column). When the threshold was not used a large number of image positions changed abruptly in the first iteration which resulted in images "jumping over" each other and a significant loss of structure. In comparison, when τ=0.05, the changes in image position were limited initially; the largest movements being those of the outlying images that can be observed on the right hand side. Subsequently, the dense central part of the layout underwent divergence. In both cases, the resulting position distribution was similar as shown in FIG. 9c. Step size control makes possible the use of conjugate gradients descent without loss of structure. This is an important aspect of the method since without it inferior visualisations were obtained In addition, the use of the threshold τ can make the optimization insensitive to a large range of γ (e.g. 0.1 to 100) and to different types of function $f(y_i)$ (i.e. linear and square of the Euclidean distance from $y_i$ to R.)

A further experiment was performed to compare the ability to spread out images when the number of images was large relative to the available layout region.

Figure 10A:
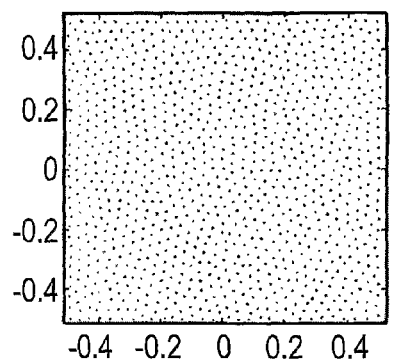
FIG. 10 is a set of three figures which compare the ability of the present invention and two prior art techniques to spread out images when the number of images is relatively large relative to the available layout region.
Figure 10B:
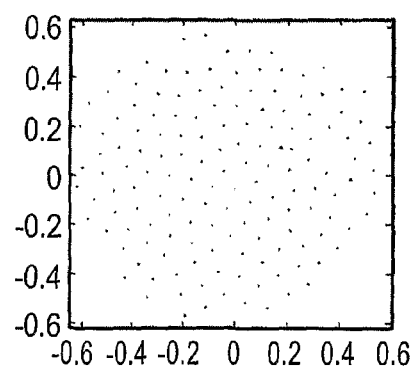
Figure 10C:
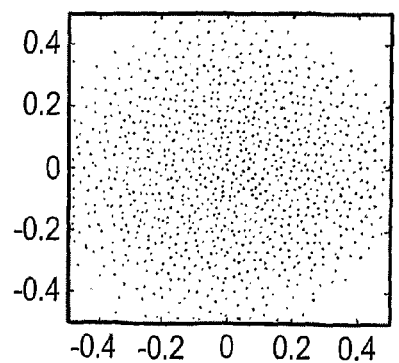

The set of 1000 images was automatically arranged on colour histograms. After initialisation with Isomap, λ was set to 1 in order to spread out the images as much as possible in the layout region. FIG. 10 shows the resulting locations of the 1000 images. A system in accordance with the present invention (FIG. 10a) yielded the most even distribution of images and a substantially constant image density over the layout region. Results based on Moghaddam et al showed a tight cluster (FIG. 10b) and the results for Nguyen et al in FIG. 10c showed a more even spread although a significant image density variation.

Figure 11A:
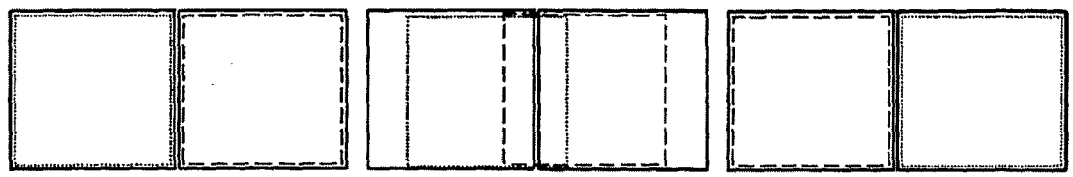
FIGS. 11a to 11d illustrate a simplified explanation of the variation in performance of the techniques described in relation to FIG. 10.
Figure 11B:
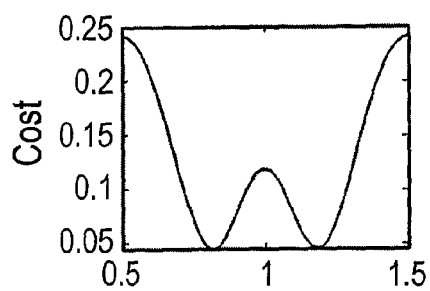
Figure 11C:
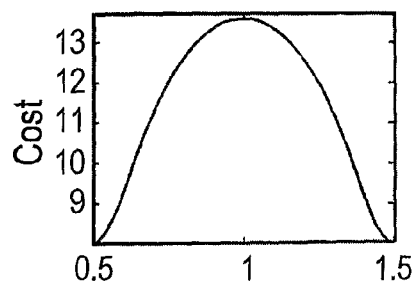
Figure 11D:
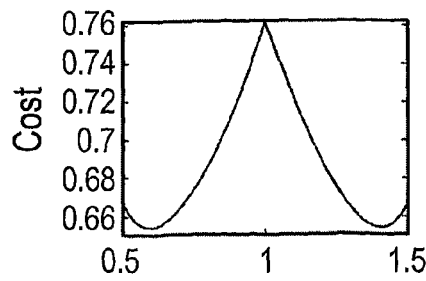
Figure 12A:
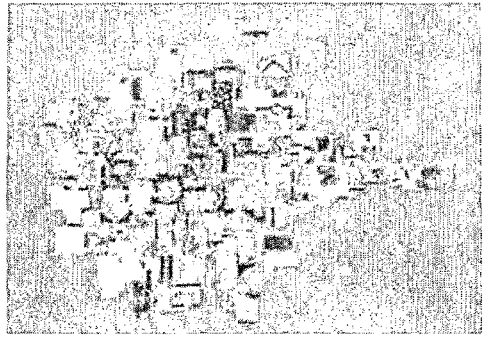
FIG. 12 shows a visualisation of 1000 images based upon colour histograms using the present invention and the prior art Isomap technique.
Figure 12B:
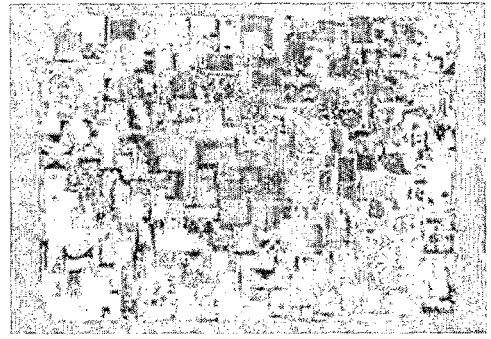
Figure 12C:
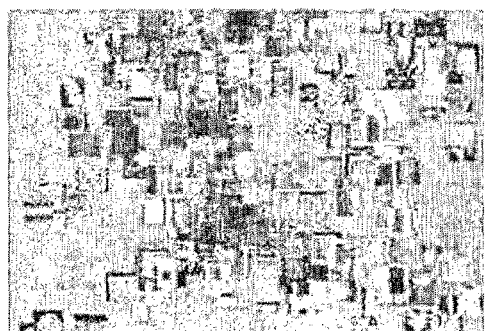
Figure 12D:
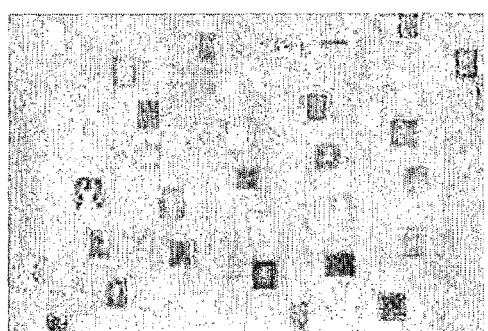

FIGS. 11a to 11d illustrate a simplified explanation of the variation in performance of the techniques described in relation to FIG. 10. In this example, four square images of width w=1.0 were arranged in a rectangular region of with 2.0 and height 1.0. Two of the images' positions are fixed so that together they fill the region. The origin is the bottom left hand corner of the layout region therefore the images have horizontal coordinates 0.5 and 1.5. The other two images are moved antisymmetrically between the two fixed ones such that when one of them is at u(0.5≤u≤1.5) the other is at 2.0. FIG. 11a shows a schematic of this experiment for three values of u. FIGS. 11b to 11d show the values of the overlap cost terms. The overlap cost using the present invention is minimized when the four images are positioned such that the distance between any image and its nearest neighbour is approximately the same. FIG. 11b. FIG. 11c shows that the overlap cost for Moghaddam et al's method is minimized when the two moveable images are positioned directly over the two fixed images.

FIG. 11d shows that the overlap cost for Nguyen et al's method is minimized when the moveable images overlap each other only slightly.

FIG. 12 shows a visualisation of 1000 images based upon colour histograms using the present invention and the prior art Isomap technique. The parameter γ was set to 10 and the method took approximately 10 seconds per iteration (without the neighbourhood approximation). In an initial distribution by Isomap (FIG. 12a) most images were clustered around the centre of the layout with fewer images irregularly distributed near the boundaries. When entropy was emphasised ($\lambda=1$) the image density became approximately constant (FIG. 12b). To better illustrate the point, the visualizations were zoomed in around one image near the layout centre. The resulting visualizations are shown in FIGS. 12c and 12d. The image positions were rescaled by the zoom operation but the images themselves were not rescaled.

Figure 13:
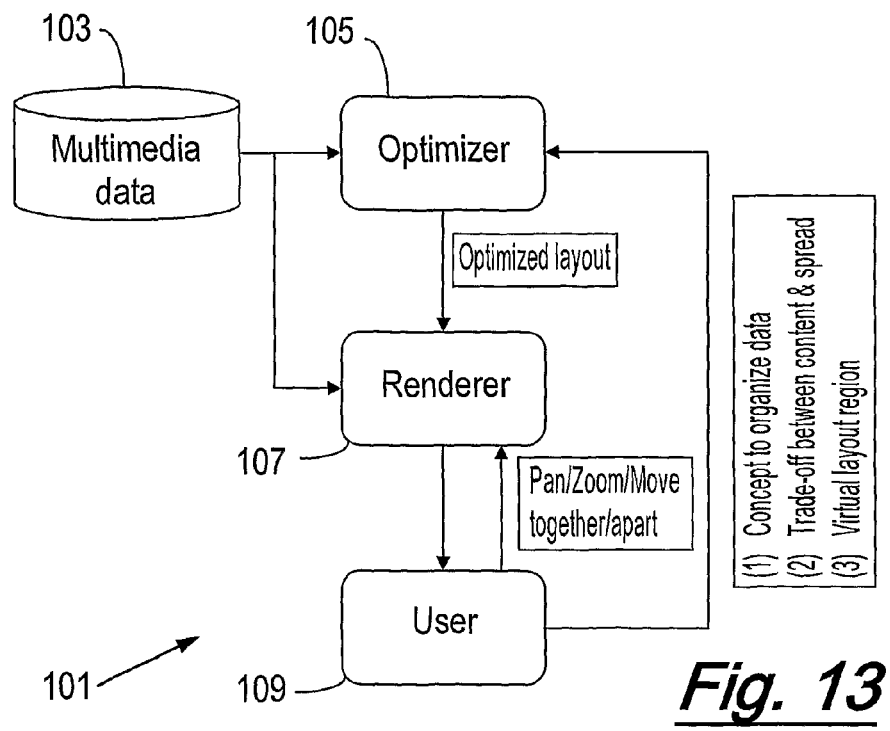
FIG. 13 is a block diagram of an embodiment of the present invention.

FIG. 13 is a block diagram which shows an embodiment of the present invention. In this example, the invention comprises a series of software modules loaded onto a computer. The system 101 comprises an optimizer 105 which processes multimedia data 103 to provide an optimized layout in a layout region of a layout space and which is used to produce renderings on a display device under the control of the user.

The user has control over the notion of dissimilarity used when comparing item content (i.e. the concept used to organise the multimedia data), and the extent to which the preservation of the content structure of the data should be traded off against the requirement to make use of the available layout region. The user can also specify the size and shape of the layout region to be used.

Figure 14:
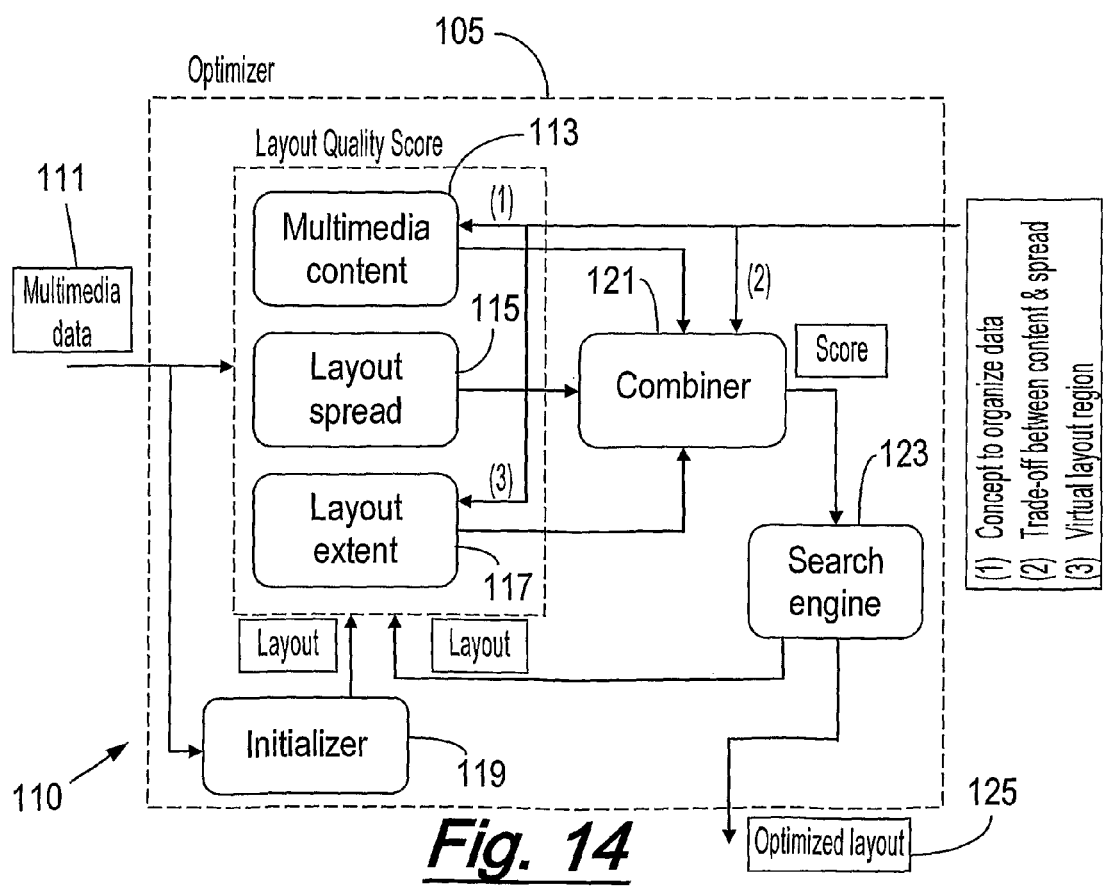
FIG. 14 is a more detailed block diagram showing an example of an optimizer module in accordance with the present invention.

FIG. 14 shows the Optimzer module of an embodiment of the invention in more detail. The optimizer module 110 comprises a number of submodules. The Initializer module 119 generates an initial layout of the multimedia data or items 111, for example by applying the Isomap algorithm. The Search Engine 123 searches for an optimal layout based on a cost function which is a combination of layout quality scores computed by the three submodules Multimedia content 113, Layout spread 115, and Layout extent 117. The multimedia content submodule 113 computes a score that measures the extent to which content structure is preserved by the layout. The Layout spread submodule 115 computes a score that measures the entropy of the layout. The Layout extent submodule 117 computes a score that measures the extent to which the constraint that the items are positioned within the layout region or regions is satisfied. The Combiner module 121 combines these scores into an overall score which the Search engine 123 uses as a cost function value for the layout. The Search engine 123 applies an optimisation method to propose layouts to be scored. The Search engine outputs an optimised layout 125 after a number of iterations in which layouts are proposed and scored.

Embodiments of the present invention can exist as, for example, a method for arranging searchable items such as digital images or multimedia icons on a display in which case the method can take the form of a computer program loaded onto computing means. It can also comprise a system for arranging searchable items such as digital images or multimedia icons on a display in accordance with the invention and may comprise a combination of hardware and software. It is anticipated that the system and method of the present invention can be incorporated into or used in conjunction with existing image browsing software and hardware to improve their performance in the manner described above.

In addition, the browser will be a device which allows a user to perform the task of selecting items from a database. The device or system of the present invention can include browsing and the browser can specify a region of the physical display upon which the search results will be shown.

In use, a browser could begin a search of a database of items based on a query item where it was asked to find the closest match, a text query or a sketch query.

In addition, the search could begin with a set of items on a display that are representative and thus provide an overview of the data set. When a user begins browsing they may have little or no idea of what they seek. They may be seeking inspiration. As they browse through the displays laid out according to various criteria, they may happen across interesting items, and their search might become more directed. In this case, the emphasis is on the user browsing through the space of items to efficiently find items of interest. In these cases and others, the user interface upon which the items are displayed should respond in real-time, forming a closed interaction loop between the user and the system.

Improvements and modifications may be incorporated herein without deviating from the scope of the invention.

The invention claimed is:

1. A system for arranging searchable items such as digital images or multimedia icons for display, the system comprising:
   an optimizer module which:
      creates a mixture distribution in a layout space by considering each item as having a spatial position in the layout space;
      minimizes a cost function for arranging items in the layout space, the cost function being a function of the entropy of the mixture distribution; and
      controls the mixture distribution in order to maximize the extent to which each item occupies a separate position in the layout space; and
   a renderer module that renders layouts so generated to a display.

2. A system as claimed in claim 1 wherein, the cost function is maximized for low entropy mixture distributions and is minimized for layouts in the layout space in which the distances between items depend upon the similarity of their content.

3. A system as claimed in claim 1 wherein, the layout space comprises one or more layout regions in which items are contained.

4. A system as claimed in claim 1 wherein, the spatial distribution of each item in layout space is a Gaussian distribution.

5. A system as claimed in claim 4 wherein, the spatial distribution is a Gaussian mixture distribution.

6. A system as claimed in claim 5 wherein, the mixture distribution has equal weights for each Gaussian component.

7. A system as claimed in claim 1 wherein, the items are laid out on the basis of content similarity.

8. A system as claimed in claim 1 wherein, the predetermined characteristics are features describing aspects such as color, texture, and/or shape.

9. A system as claimed in claim 1 wherein, size and shape information of each item's thumbnail or icon can be embedded into the cost function.

10. A system as claimed in claim 1 wherein, the entropy is the quadratic Renyi entropy.

11. A system as claimed in claim 10 wherein a pair-wise formulation of the Renyi entropy is used.

12. A system as claimed in claim 1 wherein, the step of processing the items comprises; assuming that the items are distributed on a data manifold; determining the structure of the data manifold; and applying a manifold learning technique to map items to a low-dimensional layout space so as to approximately preserve the content structure of the items.

13. A system as claimed in claim 1 wherein, the cost function is further adapted to trade off the entropy and the content structure preservation of the items in the layout space.

14. A system as claimed in claim 13 wherein, the parameter controlling the trade-off is user defined. Advantageously, this will allow the user to experiment trading off content structure preservation and layout entropy.

15. A system as claimed in claim 1 wherein, the items are arranged in 2-D on the display.

16. A system as claimed in claim 1 wherein, the items are positioned to give the appearance of a 3-D arrangement on a 2-D display.

17. A system as claimed in claim 1 wherein, the items are arranged in 3-D on a 3-D display.

18. A system as claimed in claim 1 wherein, the display comprises a display space which can be a part of a display such that the items are spread out within the display space.

19. A system as claimed in claim 1 wherein, the items are images or their thumbnails.

20. A system as claimed in claim 1 wherein, the items are icons for multimedia items such as audio or video clips.

21. A system as claimed in claim 1 wherein, the optimizer module comprises a number of sub-modules.

22. A system as claimed in claim 1 wherein, the optimizer module comprises an initializer module which generates an initial layout of the items.

23. A system as claimed in claim 1 wherein, the optimizer module comprises a search engine which searches for an optimal layout based on the cost function.

24. A system as claimed in claim 1 wherein, the cost function is computed as a combination of layout quality scores computed by a multimedia content module a layout spread module and a Layout extent module.

25. A system as claimed in claim 24 wherein, the multimedia content submodule computes a score that measures the extent to which content structure is preserved by the layout.

26. A system as claimed in claim 24 wherein, the layout spread submodule computes a score that measures the entropy of the layout.

27. A system as claimed in claim 24 wherein, the layout extent submodule computes a score that measures the extent to which the constraint that the items are positioned within the layout region or regions is satisfied.

28. A system as claimed in claim 23 wherein, the optimizer module further comprises a combiner module which combines these scores into an overall score which the search engine uses as a cost function value for the layout.

29. A system as claimed in claim 28 wherein, the search engine applies an optimization method to propose layouts to be scored.

30. A system as claimed in claim 29 wherein, the search engine outputs an optimized layout after a number of iterations in which layouts are proposed and scored.

31. A computer system comprising:
a user interface with a display;
computing means adapted to run computer software for arranging searchable items such as digital images or multimedia icons on the display screen; and
a non-transitory computer-readable medium on which is stored the computer software, the computer software comprising:
an optimizer module which:
creates a mixture distribution in a layout space by considering each item as having a spatial position in the layout space;
minimizes a cost function for arranging items in the layout space, the cost function being a function of the entropy of the mixture distribution; and
controls the mixture distribution in order to maximize the extent to which each item occupies a separate position in the layout space; and
a renderer module that renders layouts so generated to the display.

* * * * *